United States Patent
Herfet et al.

(10) Patent No.: US 7,401,166 B2
(45) Date of Patent: Jul. 15, 2008

(54) METHOD AND SYSTEM FOR CONTROLLING AND EXCHANGING DATA FOR MULTIMEDIA APPLIANCES AND AN APPLIANCE SUITABLE THEREFOR

(75) Inventors: Thorsten Herfet, Altdorf (DE); Hans-Juergen Busch, Buechenbach (DE)

(73) Assignee: Grundig Multimedia B.V., Amsterdam (NL)

( * ) Notice: Subject to any disclaimer, the term of this patent is extended or adjusted under 35 U.S.C. 154(b) by 1188 days.

(21) Appl. No.: 10/148,110

(22) PCT Filed: Dec. 6, 2000

(86) PCT No.: PCT/EP00/12257

§ 371 (c)(1),
(2), (4) Date: May 24, 2002

(87) PCT Pub. No.: WO01/47129

PCT Pub. Date: Jun. 28, 2001

(65) Prior Publication Data

US 2003/0009581 A1    Jan. 9, 2003

(30) Foreign Application Priority Data

Dec. 21, 1999   (DE)   ............... 199 61 644

(51) Int. Cl.
*G06F 3/00*   (2006.01)
*G06F 13/12*  (2006.01)

(52) U.S. Cl. ............... 710/17; 710/16; 710/18; 710/19; 710/62

(58) Field of Classification Search ............... None
See application file for complete search history.

(56) References Cited

U.S. PATENT DOCUMENTS

| 4,689,786 | A  |   | 8/1987 | Sidhu et al. |       |
|-----------|----|---|--------|--------------|-------|
| 5,717,950 | A  | * | 2/1998 | Yamaguchi et al. | 710/8 |
| 5,745,699 | A  |   | 4/1998 | Lynn et al.  |       |
| 6,944,681 | B1 | * | 9/2005 | Christensen et al. | 710/8 |

FOREIGN PATENT DOCUMENTS

EP    0 482 951 A2    4/1992

* cited by examiner

*Primary Examiner*—Alan S. Chen
(74) *Attorney, Agent, or Firm*—Boyle Frederickson, S.C.

(57) ABSTRACT

The present invention relates to a method and a system for controlling and/or exchanging data for multimedia appliances and an appliance suitable therefor According to prior art, methods and systems for controlling and exchanging data for multimedial appliances have the disadvantage that said methods, systems and appliances are very simple with regard to the requirements and the possibilities at hand and involve considerable hardware requirements. The invention is based upon the fact that each appliance which is integrated into the system sends a message at regular intervals and by means of the bus as soon as said appliance has been activated The type of the appliance can be detected by means of said message which also reveals that the appliance is switched on, i.e. active. All the remaining active appliances in the system evaluate said messages and send such messages themselves as long as said appliances are active. The active appliances can control other active appliances or exchange data with other active appliances if required because each active appliance is thus provided with information on the other active appliances in the system.

18 Claims, 7 Drawing Sheets

| Byte_0 | Byte_1 |
|---|---|
| ttdd dddd | mmss ssss |

| Byte_0 | Byte_1 | Byte_2 | Byte_3 | Byte_4 | Byte_n-2 | Byte_n-1 |
|---|---|---|---|---|---|---|
| 1tdd dddd | mmss ssss | ssll llll | hhhh hhhh | llll llll | cccc cccc | cccc cccc |

Fig. 11

| Byte_0 | Byte_1 | Byte_2 | Byte_3 | Byte_4 | |
|---|---|---|---|---|---|
| 10dd dddd | 01ss ssss | ttll llll | aaaa aaaa | aaaa aaaa | ... |

Fig. 12

| Byte_0 | Byte_1 | Byte_2 | Byte_3 | Byte_4 | Byte_5 |
|---|---|---|---|---|---|
| 11ss ssss | 01dd dddd | tt00 0001 | rrrr 0000 | cccc cccc | cccc cccc |

Fig. 13

| ... | Byte_2 | Byte_3 | Byte_4 | Byte_5 | Byte_6 | Byte_7 |
|---|---|---|---|---|---|---|
| ... | ttll llll | aaaa aaaa | aaaa aaaa | Read-Length | cccc cccc | cccc cccc |

Fig. 14

| Byte_0 | Byte_1 | Byte_2 | Byte_3 | Byte_4 | ... |
|---|---|---|---|---|---|
| 11ss ssss | 00dd dddd | tt00 0011 | rrrr 0000 | data | .... |

Fig. 15

Key to Figure 16: Vergl-Daten = comparison data; Setz-Daten = set data

| Byte_0 | Byte_1 | Byte_2 | Byte_3 | Byte_4 |
|---|---|---|---|---|
| 10dd dddd | 10ss ssss | ttll llll | aaaa aaaa | aaaa aaaa |

| Byte_5 | ... | Byte_x | ... | Byte_n-2 | Byte_n-1 |
|---|---|---|---|---|---|
| Vergl-Daten | ... | Setz-Daten | ... | cccc cccc | cccc cccc |

Fig. 16

| Byte_0 | Byte_1 | Byte_2 | Byte_3 | Byte_4 | ... |
|---|---|---|---|---|---|
| 11ss ssss | 10dd dddd | ttll llll | rrrr 0000 | data | ... |

| type | key | value |
|---|---|---|
| 2 bit | 6 bit | 24 bit |

Fig. 19

METHOD AND SYSTEM FOR CONTROLLING AND EXCHANGING DATA FOR MULTIMEDIA APPLIANCES AND AN APPLIANCE SUITABLE THEREFOR

The present invention is concerned with a method and a system for controlling and/or
exchanging data for multimedia appliances as well as an appliance suitable for it. Methods and systems for controlling and/or exchanging data for multimedia appliances, for example, electronics entertainment appliances, have become known in the past, using a link between the individual appliances, for example, a bus.

In the Sat-Link system, a link between a satellite receiver and a video recorder is utilized. The video recorder controls, in the timer mode, that is, when the recording of a broadcast of a certain broadcast channel is programmed, the tuning circuit of the satellite receiver, in order to select the corresponding broadcast channel in the satellite receiver. It is not possible to transfer acknowledgements, rather, unidirectional control commands are transferred from the video recorder to the satellite receiver exclusively. Only the more recent satellite receiver modules for TV appliances make acknowledgement possible in combination with a corresponding video recorder, through pin 8 of the SCART socket. Here, bidirectional communication is simulated cross connection of two unidirectional connections. The control commands received by the TV appliance are further conducted through pin 8 of the SCART socket to the connected video recorder and/or satellite receiver. As a result of this, the connected appliance can be operated in spite of shading of the IR receiver, for example, when a closed rack is incorporated.

A bus concept for electronics entertainment appliances has become known under the name Megalogic; this is produced and distributed by the Applicant. In this system, communication and turning on of the appliance, for example, TV appliance, video recorder and satellite receiver becomes possible. The data rate is about 200 bps, and the data signal is transferred to pin 10 of the SCART socket. The individual connections are turned on through open collector stages. The network topology normally consists of linking peer-to-peer connections, but can also be realized electrically with a SCART distributor. In principle, there are 16 fixed appliance addresses (0-15).

Other buses for control of data exchange are based, for example, on the standard IEEE1394 and make the so-called "Hot Plug & Play" possible, that is, appliances can be integrated newly into the bus and put into operation immediately without initialization of the new appliance being necessary. Arbitrary turning on and turning off of the appliances is also possible and is recognized in the system, since the individual appliances have the corresponding hardware prerequisites. In these systems, a definition is planned which is universal for the manufacturer, and thus, using digital communication, it is possible to link various appliances (DVB-STB, Internet-STB, DVD, IDVD, DVCR, Game Console, TV, and others). Simultaneous transfer of control and AV data is possible.

The known methods and systems for control and for exchanging of data for multimedia appliances, however, all have the disadvantage that, on the one hand, they are very simple—both with regard to the necessary expenditure as well as with regard to available possibilities (Sat-Link system, Megalogic), where especially the possibility of recognition of the turning-on and turning-off processes of the individual appliances represents problems within the system and another disadvantage is that they usually require extensive hardware (systems according to IEEE1394).

Therefore, it is the task of the present invention to give a method and a system for controlling and/or exchanging of data for multimedia appliances, as well as to provide an appliance suitable for it, which permits an almost arbitrary configuration of the system with little additional expenditure and where individual appliances of the system can be operated arbitrarily and recognized as well in the system at all times.

In the present invention, this task is solved by the characteristics of claims 1, 9 and 17

In the invention, the basic assumption is the consideration that each of the appliances incorporated into the system sends a message through the bus at regular intervals, as soon as it has become activated. This message allows first of all the recognition of the nature and type of the appliance and, secondly, it can be seen from the message that the appliance is turned on, that is, it is active. All other active appliances in the system evaluate these messages and themselves send such messages as long as they are active. Since, in this way, each active appliance has information about the other active appliances in the system, if required, the active appliances can control other active appliances or exchange data with them.

The advantage of the device according to the invention should be regarded in the fact that appliances can be linked to each other with almost no additional circuit-technological expenditure in order to control each other mutually or in order to exchange data with each other. Appliances which should not be operated at certain times, can also be separated completely from the energy supply, for example, the main voltage, since they will provide information automatically on the actual status of the other appliances after they had been activated.

Other advantages of the present invention follow from the dependent Claims, as well as from the description of embodiments of the devices according to the invention for digital transfer of audio signals given below, with the aid of figures.

The following are shown.

In order to facilitate the understanding of the present invention, in the figures, only the components of those embodiments are represented, which are of importance in connection with the invention. The same components in the figures have the same reference symbols.

In general, for example, the following requirements can be set up for a method and a system for the controlling and exchanging of data for multimedia appliances:

| | |
|---|---|
| Data rate: | up to approximately 100 kbps |
| Type of data: | control and system data |
| Topology: | bus |
| Transport medium: | cable |
| Packet-synch: | edge-activated |
| Medium termination: | none |
| Organization: | peer-to-peer |
| Type of linking: | point-to-point, broadcast |
| Arbitration: | CSMA/CD |
| Addressing: | GUID, Node-ID |
| Error protection: | ARQ/CRC |
| Management: | register-based |
| XON/XOFF | Hot Plug & Play |

It follows from the requirements given above that the individual appliances are linked through a cable, which runs from appliance to appliance. Thus the appliances must have two sockets. Appliances, which are clearly end appliances (for example, camcorder), are exceptions to this.

Appliances can be connected to the bus at any time and separated from it (Hot Plug & Play). Information about the appliances and their properties are set up in a firmly agreed-upon structure under an agreed-upon base address.

The structure of the system will be explained below with the aid of the ISO/OSI layer model. This will show the locations where certain properties were omitted in order to make realization at small expenditure possible.

Figure 1:
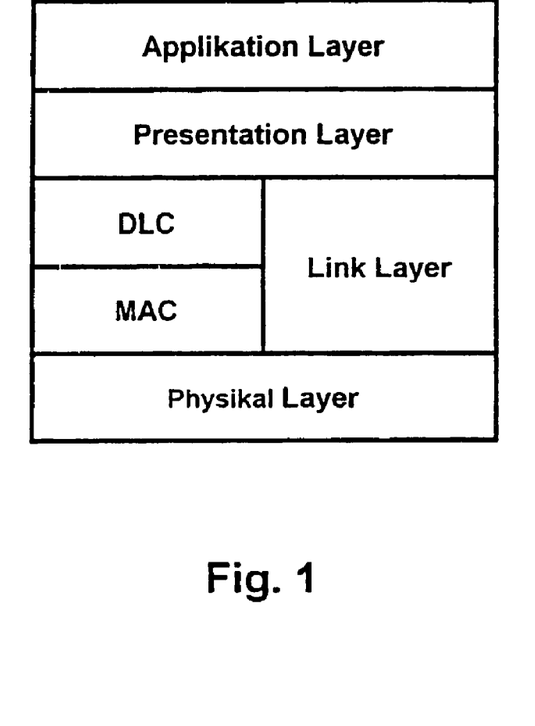
FIG. 1 is a schematic representation of a layer model for a system for controlling and exchanging of data for multimedia appliances.

FIG. 1 shows the layers of the present system. A physical layer makes transfer of individual data packets available. Since only individual packet transactions are allowed in order to minimize the load on the processor or microcontroller used in the individual appliances, the physical layer makes available services for the transfer of packets with variable length.

A link layer provides mechanisms for access to the medium (medium access layer: MAC layer), error protection as well as individual types of packets. In addition, the link layer (device link control layer, DLC) ensures address handling. Each appliance contains a GUID (64 bit MAC address), but this is not used for transfer since this would lead to unnecessarily high loading of the processors. For this reason, a NODE-ID (6 bit long) is allocated. The allocation of this NODE-ID is also the task of the device link control layer (DLC).

In order to simplify the system, a network layer, as well as a transport layer, are omitted, as they are defined according to an ISO/OSI layer model. They can be omitted because it is not intended to combine various buses with different data traffic to one network. Therefore, routing mechanisms are not necessary.

A session layer can also be omitted which serves to further subdivide a communication, because, first of all, in the case of an error, not the complete communication has to be repeated, and, secondly to increase security (encoding of individual sessions). Since the planned data blocks are small, the session layer is omitted. The content of the individual data packets is defined in the presentation layer. For the present system, these are mainly the contents of the predefined register (CSR) as well as direct control commands (RC codes).

The individual appliances are defined in the application layer; since the individual appliances are not of importance in connection with understanding the present invention, description of the application layer is omitted.

In order to avoid expenditure, two criteria must be observed with highest priority for the realization of the physical layer, namely, as small as possible additional hardware costs, for example, by using a simple bus coupler and components which are present in the appliances to be linked anyway, for example, UART (universal asynchronous receiver transmitter). Individual partial regions of the physical layer will be described in the following sections.

Figure 2:
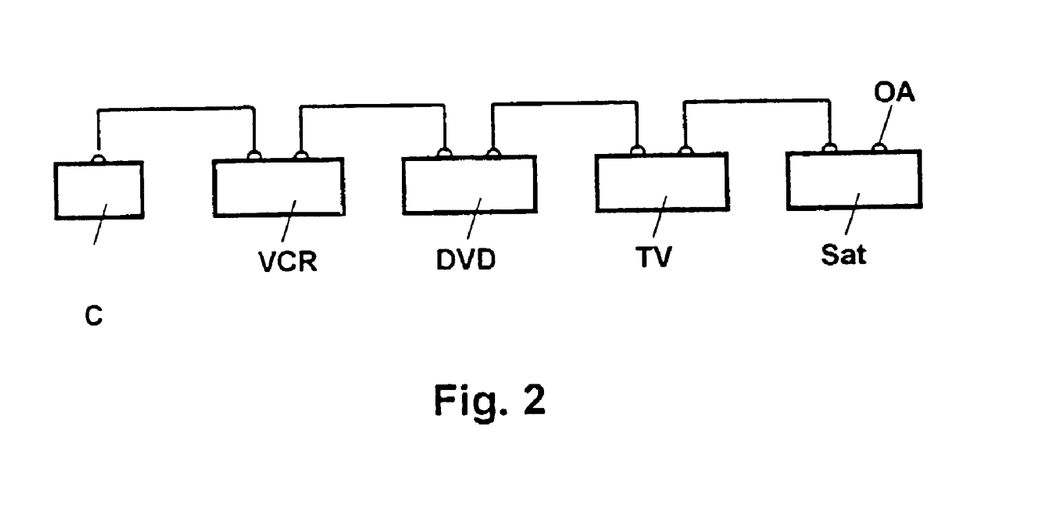
FIG. 2 is a schematic circuit diagram of a system for controlling and exchanging data for multimedia appliances.

A possible bus topology is shown in FIG. 2. The bit transfer takes place with a standard UTP cable of category 3 (a pair of twisted wires) with a characteristic impedance of 100 Ω. For reasons of cost, standard chinch sockets are used for sockets. In order to avoid confusion with Sat-Link, Audio or S-VHS sockets, other sockets can also be used (for example, jacks). However, the chinch socket represents the most cost-effective variant.

The bus is operated without termination OA. The linking of the bus is done by looping through appliances with two sockets, for example, video recorder VCR, DVD appliances DVD, TV appliances TV and satellite receiver Sat. Only dedicated end appliances, for example, camcorder C, represent an exception and these are equipped with only one socket. As a result of this, stubs are avoided.

As mentioned above, cost-effective realization between individual end appliances is possible only if existing resources can be utilized. Therefore, the protocol to be used is designed in such a way that an existing UART can be used, in order to reduce the software load on the processor in the appliances.

With a predetermined base speed of the protocol, for example, 115,200 bps or the clock frequency of the bus resulting from it and a predetermined maximum packet length, for example, 69 bytes, pure software evaluation is possible, since the processor requires only a short time (6 ms) for receiving the packet, because receipt of the packet must be done in real-time operation. Appliances or their processors, for which this time is too long, can be signaled their maximum permissible packet length through a SPLIT_TIME-OUT register, which will be described later. The following decoding processes can be done within the normal task-switching of the processor.

Problems in the utilization of existing UARTs could occur under circumstances when the chosen clock frequency of the bus should be a divisor of the processor clocks of the appliances. As a result of this, it is impossible to adjust the frequency divider in such a way that the clock frequency of the bus (115,200 bps) be reached with the required accuracy. Then, in order to use the UART, adaptation of the processor clock is necessary, but the effects of this on other processes must be verified accurately.

Several solutions are possible for producing an interface between appliance and bus.

In a first solution, it is planned to realize the interface as a complete software solution. The access to the bus uses an input port and an output port of the processor in the appliance. This solution is suitable especially for all processors, which do not have an internal UART. For example, a edge-activated interrupt input is necessary for recognition of start bits. After a start bit interrupt had occurred, the processor must remain in a read routine until the entire data frame (=packet) is read in. In order not to load the processor unnecessarily, there is a possibility of masking the used interrupt input with an external wiring for the rest of the data frame. Such a wiring will be explained later.

A second possibility is suitable for processors or microcontrollers, which have an internal serial interface (UART interface) available. An output (TRX) is connected to the bus through an open collector and an input (RXD) is utilized correspondingly. Masking of the interface interrupt can be achieved here, too, through an external wiring. The software load of the processor is significantly lower in comparison to a solution without serial interface.

There are limitations with regard to the adjustable baud rates for the integrated UART module, as already indicated above. The baud rate clock is derived through an internal, adjustable hardware divisor of the CPU quartz crystal oscillator. Thus, the scanning of the possible baud rate values will be dependent on the microcontroller used. If this deviation obtained is outside the established tolerances of the bus data rate (in the Example, 115,200 bps), this still can be adjusted by a variation of the quartz clock. If this quartz clock change is not possible for other reasons, then the serial interface can/must be realized through a software solution.

In the case of low-performance processors or microcontrollers, there is another possibility of using an external UART component in order to take the load off the processor. In any case, such an external component represents a cost, which is not to be underestimated, as a result of which change to a faster/more powerful microcontroller may be more expedient.

In order to realize the bus, it is planned to make the bus connection through a twisted bus line (UTP) without termination, as indicated above. Spur lines should be avoided. The appliances make two parallel-connected sockets available for transfer. Only end appliances, for example, camcorders, represent an exception. Activation is done through an open collector stage. As a result, 0 V is the dominant level (one appliance is sufficient to force the level on the bus) and is defined as logically null. The open-collector stages are designed high impedance (100 k$\Omega$), in order to limit the current flowing through the bus, even in case of maximum bus occupancy.

Figure 3:
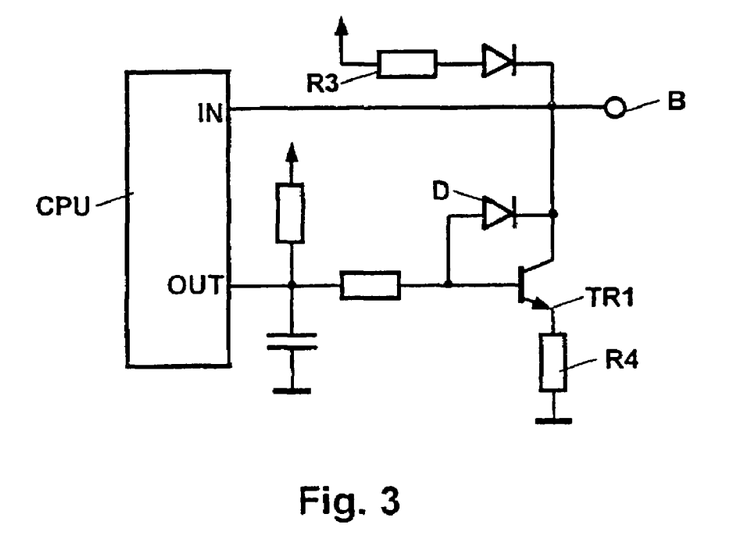
FIGS. 3 to 5 are practical examples of connection of processors used for multimedia appliances to a bus.
Figure 4:
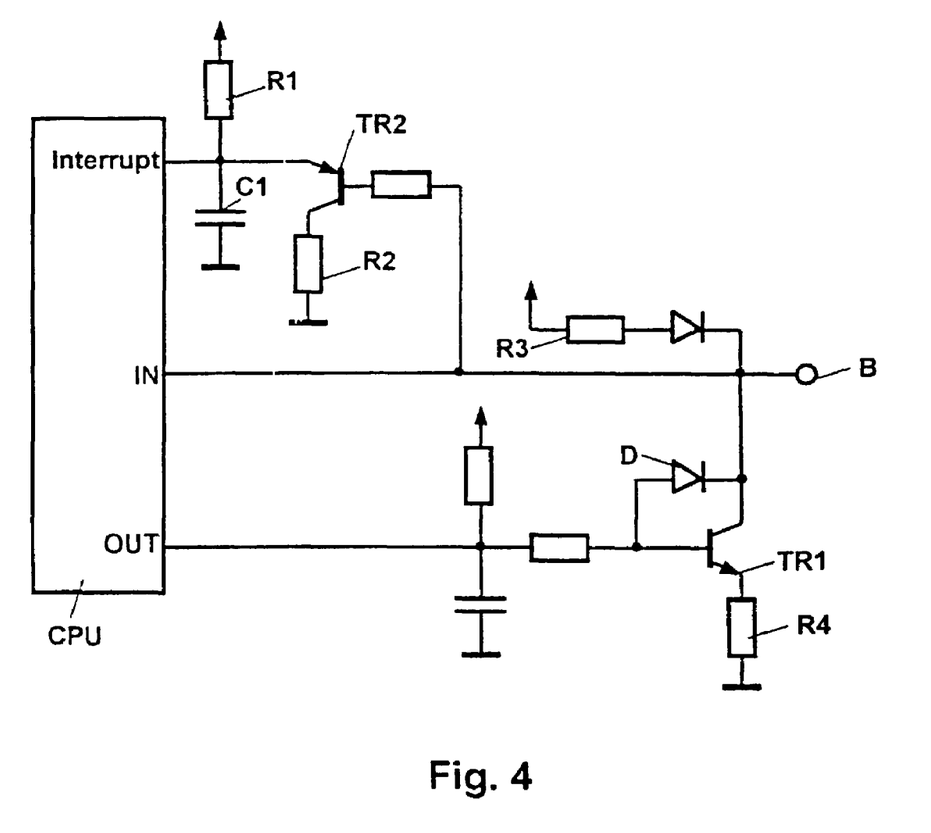
Figure 5:
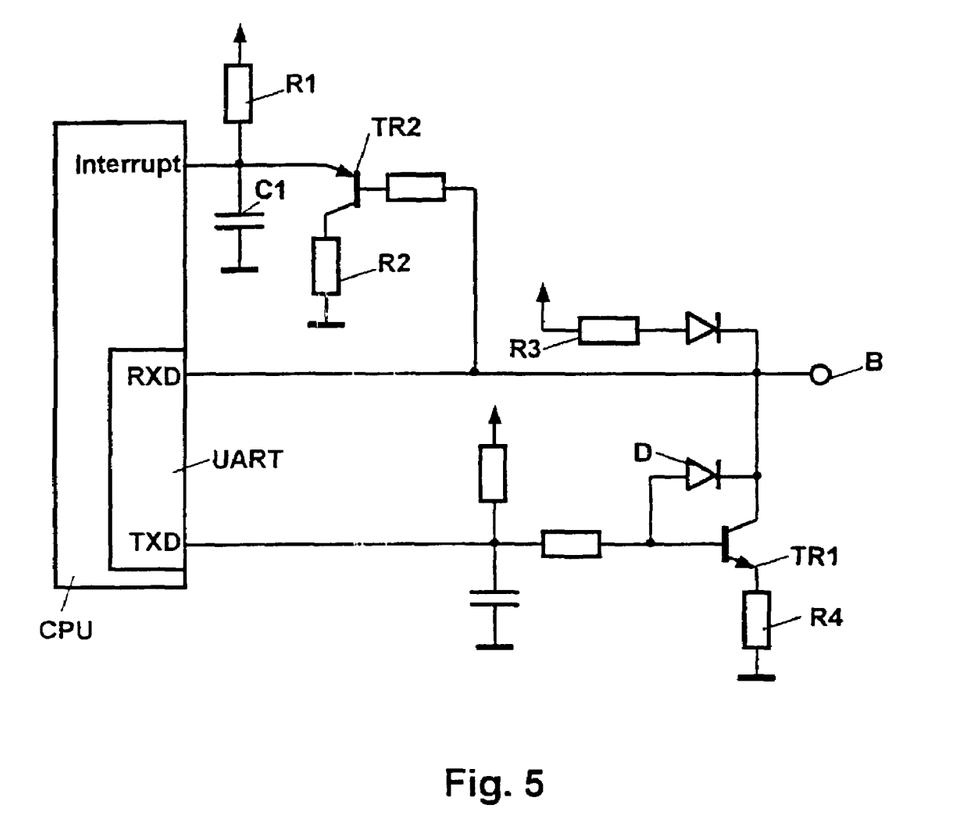

FIGS. 3 and 4 show practical examples of open collector stages for activation of the CPU processors used in the appliances. FIG. 3 shows a practical example without interrupt masking. FIG. 4 is a practical example with interrupt masking. FIG. 5 shows a practical example of an open collector stage for the activation of a microcontroller CPU with a UART, in which interrupt masking is provided.

The time during which the interrupt is masked follows from a time constant $T_1 = R_1 \cdot C_1$. The discharge time for $C_1$ through the discharge transistor TR2 must be smaller than the transfer time for one bit. The latter will be referred to below as $T_e = R_2 \cdot C_1$.

When turning on transistor TR1, the base current through diode D between base and collector is limited. This current goes to the collector through the small on-voltage. During turning off, the transistor TR1 requires much less time. A suitable diode D is, for example, type BAT 85, a special switching diode.

The connection to the bus is done through socket B. In order to loop through the bus, a second bus can be connected parallel to the bus B shown. The resistors of the open-collector stages have, for example, resistance values of R3=100 k$\Omega$ and R4=220 $\Omega$.

Figure 6:
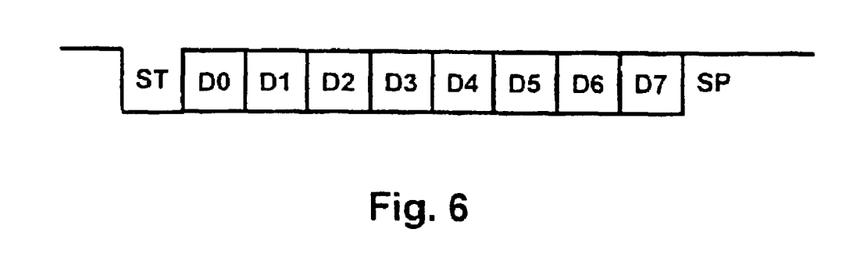
FIG. 6 is a practical example of the structure of an elementary data packet.

In order to realize both a UART support as well as a pure software solution, the packets are designed in such a way that, at the beginning of the packet, a UART can react as well as an interrupt can be activated. Such a packet is shown in FIG. 6. The falling edge of a start bit ST triggers the read-in process of the packet. At the same time, the RC time unit ($R_1$, $C_1$) for interrupt masking is discharged through the null bit and thus locks the following edges until the threshold value after transfer of a packet is reached again. Scanning the individual data bits is now taken over by a software routine in processors without UART, or it is taken over by the integrated UART module of the microcontroller. For example, the entire byte frame consists of ten bits, the start bit ST, eight data bits D0 to D7 and a stop bit. For example, the data bit D0 is set up as the bit with the lowest value in order to achieve the desired compatibility with the UART. Yet, when transferring several bytes, the highest value byte is transferred first.

As already stated above, up to 69 physical byte frames form one frame of the physical layer. The byte frames are transferred directly one after the other. Gaps occur only between the frames (arbitration gap) and between the frame and acknowledge (acknowledge gap).

Each received frame is acknowledged by the addressed appliance (node) with an acknowledge signal. For example, the distance to the previous frame should be 3±1 bit. Then there must be a gap of at least 20 bit≅175 μs observed until a new message can be sent from an arbitrary appliance in the network. During this time, the time function element $C_1$ (FIGS. 4 and 5) had to be charged to the operating voltage so that interrupt release occurs.

The link layer provides the appliance addressing, error protection as well as bus arbitration. Fair arbitration, that is, the same arbitration probability and arbitration time for all appliances is achieved through a simple, random time-constant after the completion of the arbitration gap. In combination with CRC (error protection) and acknowledge, in this way reliable packet transfer is achieved with acceptable throughput.

Three different packets are provided for the bus. An ALIVE packet makes it possible to realize the Hot Plug & Play without additional hardware measures. One DATA packet makes labeled transfer of data possible. A special case is the transfer of remote control commands. Finally, one CSR packet makes exchange of information between appliances possible, for example, the abilities of the appliances or the inner status of the appliances. The CSR packet also makes register available for transactions (READ, WRITE, LOCK).

Figure 7:
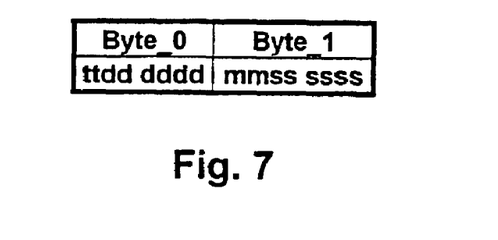
FIGS. 7 and 8 are practical examples of the structure of different data packets.

FIG. 7 shows the structure of a general header. The general header consists of two bytes, byte_0 and byte_1.

The first byte, byte_0, determines both the packet type tt, as well as a target address dddddd. This facilitates rapid filtering of the packets and leads to taking load off the processors in the appliances. For example, ALIVE packets are labeled as type 01, that is, the first two bits of byte_0 have a coding which is logically zero and one. For example, if, in order to determine the network topology, all connected appliances determined, all ALIVE packets can be evaluated very rapidly, while other packets are discarded. The target address is coded with the six dddddd bit. If the lower half of the addresses is allowed for coding, that is, the lower five bits, a maximum of 32 appliances can be addressed plus the 3Fh (hexadecimal data) as broadcast address, which is prescribed for ALIVE packets. The upper half of the addresses can be provided, for example, for future uses and services, such as point to multipoint.

The second byte, byte_1, contains a modifier mm, which characterizes either the service or the transaction type, and a source address ssssss, that is, the address of the sending appliance. ALIVE, data and RC code (remote control commands) are predefined as services. Another type is available for future use. In addition, a generic type is available, which can, for example, refer to the next byte for description of other services. READ, WRITE and LOCK are available as transactions and these will be described below.

A possible coding for the general headers is given below.
byte_0
  2 bit type: tt
    00=DATA
    01=ALIVE
    10=CSR request
    11=CSR response
  6 bit target address: dddddd 00h-1Fh=target address of the appliance (NODE-ID)
3Fh=broadcast, prescribed in case of ALIVE packets
byte_1
  2 bit modifier: mm
  In the case of type=ALIVE
    00=valid
    01=invalidate
    10=reserved for future use
    11=reserved for future use
  In the case of type=DATA
    00=ALIVE packet or RAW DATA
    01=RC code
    10=reserved for future use
    11=GENERIC DATA
  In the case of type=CSR request/CSR response
    00=READ
    01=WRITE
    10=LOCK (test and modify)
    11=GENERIC TRANSACTION
  6 bit source address: ssssss For error protection, for example, a 16 bit CRC code is used. The code is set up through the entire packet, but without start and stop bits. As CRC code, for example, the code defined by ITU-T (for example, for HDLC) with the following data is chosen:

Generator polynomial: $p(x)=x^{16}+x^{12}+x^5+x^0$

Coding by: $crc(x)=data(x)\cdot x^{16} \bmod p(X)$

Initialization is not necessary, because a valid data word is always given through the header with at least 2 bytes. The receiver can now check either $data\,(X)\cdot x^{16} \bmod p(x)=crc(x)$ or $(data(x)\cdot x^{16}+crc(x))\bmod p(x)=0$ for validity. It should be noted that the arithmetic is carried out through the GF(2) (Galois field: binary range of numbers), that is, addition and subtraction of the coefficients take place without transfer (EXOR).

With the given CRC code, typical errors can be recognized in line-bound networks, that is, individual bit and double bit errors can be recognized by scanning errors or threshold value errors (noise, phase shift), and burst errors (EMV disturbances, for example, by electric motors) can also be recognized.

The packets of the link layer are confirmed by an acknowledge packet. The acknowledge packet follows the message directly, where the signal gap (acknowledge gap) can be 3±1 bit. The acknowledge packet is designed in such a way that both in the case of point-to-point linking as well as in the case of broadcast message a link layer acknowledge is possible. The exact definition of the acknowledge and the evaluation in the case of broadcast message will be described below.

Figure 8:
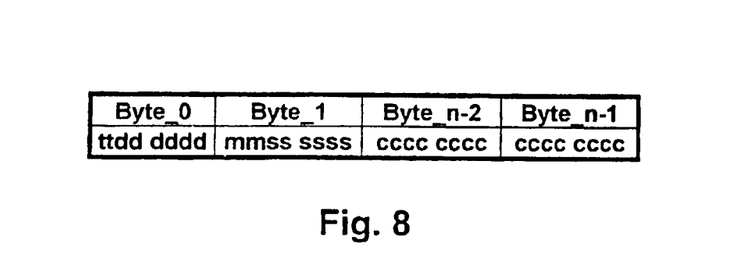

FIG. 8 shows a possible practical example for an ALIVE packet. The ALIVE packet consists of four bytes, byte_0 to byte_n−1. Byte_0 and byte_1 correspond to the general headed described above. The duration of an ALIVE packet is accordingly 350 μs. Thus, the sending of one ALIVE packet per second for each appliance represents a good possibility of realization, $T_{AM}$=1 s.

Thus, the bus occupancy with the assumption of 90 bit per ALIVE packet (40 bit packet+4 bit acknowledge gap+10 bit acknowledge+36 bit arbitration gap) is usually below 1% in the normal case.

| Σ appliances | bus occupancy |
|---|---|
| 2 | 0.16% |
| 4 | 0.31% |
| 8 | 0.62% |
| 16 | 1.25% |
| (32) | 2.50% |

Since the ALIVE packets are broadcast packets, that is, the ALIVE packets are directed to all appliances connected to the bus, a special acknowledge is agreed upon: the acknowledge is examined in order to fine out if at least one appliance has received the ALIVE packet correctly. Due to the dominance of the logical null, the following agreement is made:

ACK_OK=0Fh

ACK_ERR=FFh

Figure 9:
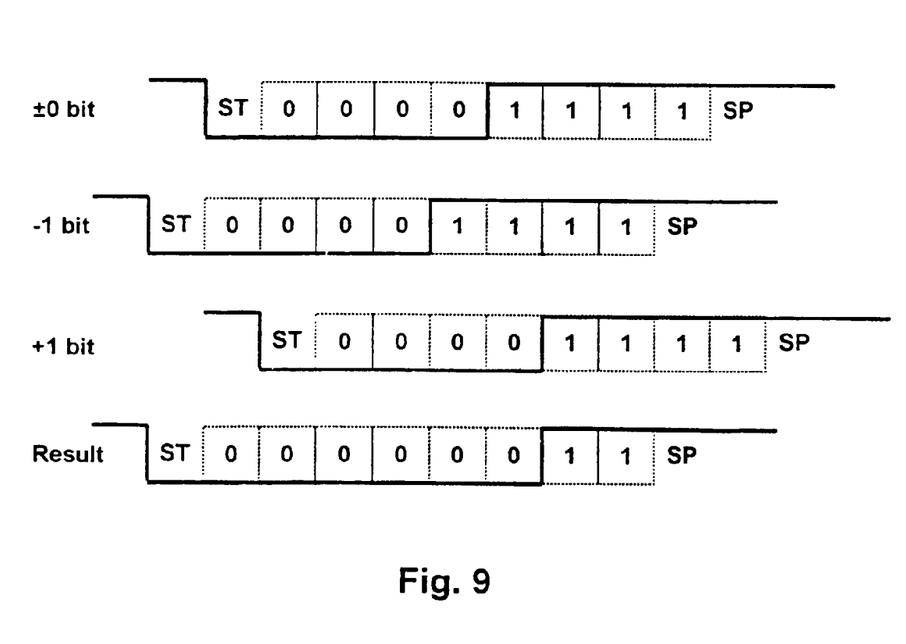
FIG. 9 shows the effect of time errors on data packets.

If the acknowledges occur at different times, start bits could be interpreted as a logical null. However, it can be seen from FIG. 9 that always at least two bits remain in order to recognize that at least one appliance was able to decode the ALIVE packet correctly. In FIG. 9, three acknowledges are shown for this, with 0 bit, −1 bit and +1 bit time error. The packet result obtained shows the two remaining bits.

The modifier mm in byte_1 of the ALIVE packet is needed for collecting, in the case of linking two buses, the doubly present NODE-IDs, which occurs in this case under certain circumstances. In this case, it is shown that the NODE-ID is invalid and must be negotiated again. The procedure necessary for this will be described later.

Figure 10:
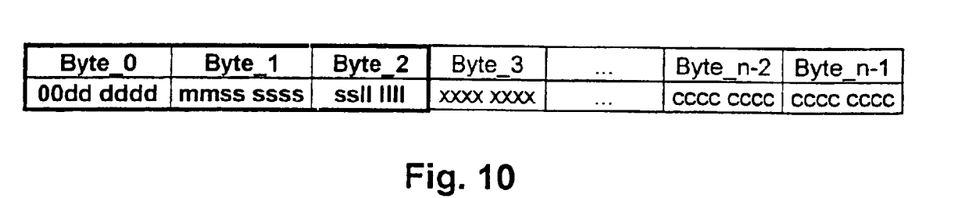
FIGS. 10 to 17 are practical examples of the structure of different data packets.

FIG. 10 shows a possible practical example for a DATA packet. The DATA packets have the same general header with the type-labeling DATA. The total header is 3 bytes long, byte_0 to byte_2. The additional byte, byte_2, is coded as follows:

| Byte_2 | ss: | 2 bit transaction code (given by the sender) |
| | 111111: | 6 bit useful data length (number of bytes without header and CRC) |

This additional header byte makes coding as well as the useful data length 111111 possible, to adjust the receiving processor and the CRC decoder, as well as the coding of new attempts. This may become necessary when a packet is correctly received, but the answer is not sent or was perturbed during transfer. In this case, for example, the controlled appliance may already have switched a program so that when the controlling appliance makes a new attempt, this could lead to a repeated unintended program change. This case can be avoided by the transaction code ss. The other bytes shown contain useful data.

Figure 11:
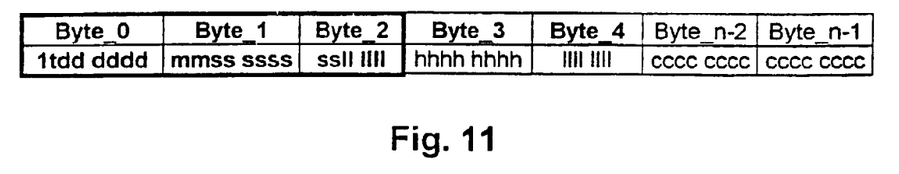

FIG. 11 shows a possible practical example for a CSR packet. CSR packets represent a special case of data packets and correspondingly also have a 3 byte long header, byte_0 to byte_2. The CSR packets can already be recognized at the first bit, which is set to logic one. The second bit t shows if we are dealing with a request or a response. The modifier mm shows which transaction will be requested or answered. The special characteristic consists in the next two bytes:

Byte_3 8 bit address (higher value byte of the 16 bit CSR address)

Byte_4 8 bit address (lower value byte of the 16 bit CSR address)

With the 16 bit CSR address, 64 kbytes can be addressed. The 64 kbytes make all appliance-specific properties, as well as the memory locations available for reading and writing of values. This structure makes rapid inquiry of the system properties as well as simple hierarchical storage of all information in the network possible. The architecture and memory occupancy of the implemented CSR architecture will be described later. The address range prescribed for all appliances is limited to 2 kbytes. The other represented bytes contain useful data.

The medium access layer must make available a fair access to the individual appliances with optimized throughput at the same time. Since the bus should not require any additional hardware for the physical layer and link layer, the access mechanism must be highly simplified. For example, a CSMA/CD mechanism (Carrier Sense Multiple Access Collision Detection) can be used for this purpose.

As described above, the physical frame has two so-called gaps (signal gaps) which determine the system behavior, namely the acknowledge GAP and the arbitration GAP. These signal gaps control the access to the medium (bus). The individual appliances detect incoming packets by the falling edge of the start bit after a set number of logic ones. After release of the interrupt, either at the beginning of a new packet or for sending, which occurs after about 20 bit timings, an appliance ready to send must wait for a random number of bit timings before the sending process begins. Then, just before sending, it is checked one more time if the channel is still free.

The random number of bit timings to be waited for is not chosen anew for each sending process in order to simplify the system, because this would necessitate an additional random number generator. Rather, it is provided that the NODE-ID, which, as described above, is allocated randomly, directly follows the additional time interval. Thus, the maximum gap between two packets is > 20+32=52 bit (for the case, that a maximum of 32 appliances are allowed), from which a gap of 20+16=36 bit follows on the average.

The task of the device control layer is to allocate the NODE-ID. Each appliance is established by a 64 bit GUID, which can be constructed as follows:

| Byte 0-2: | 3 byte vendor-ID |
| --- | --- |
| | 0x00D0D5h = vendor-ID of the Applicant |
| Byte 3-7: | 5 byte device ID) |
| | 0xAAAAXXXXXXh = vendor-ID of the Applicant |
| | AAAAh: not equal to 0xFFFEh and 0xFFFFh |
| | XXXXXXh: arbitrary |

When allocating the device-ID, care must be taken that it corresponds to the general scheme in the allocation of appliance addresses of the particular manufacturer. The MAC address, which is unique for each appliance, is not suitable for use in the physical layer of the bus, since the number of addressable appliances and the length of the addresses is much too large. Therefore, within the bus, the NODE-ID is allocated, which is only 6 bit long, as described above in connection with the packet headers.

In order to ensure the randomness of the arbitration gap and to further reduce collision, the NODE-ID is allocated randomly. Here, the randomness is not strictly specified and therefore does not have to be produced by a random number generator. Rather, random register contents or simply the lower 6 bit of the MAC address are sufficient as an initial value.

Before the NODE-ID selected in this way can be utilized, the appliance must wait for a duration of $N \cdot T_{AM}$ with N=3 and $T_{AM}$=ALIVE packet interval.

As a result of this, it is ensured that ALIVE packets were received by all appliances and therefore all already allocated NODE-IDs are known. If the NODE-ID selected by the appliance is already present, another must be attempted, for example, by addition of the prime number 17 (addition mode 32). The first NODE-ID, to be used without collision, is selected and is made known in the network with corresponding ALIVE packets.

With this mechanism, the allocation of the NODE-IDs to the task-related goal of Hot Plug & Play can be achieved without any great expenditure. An appliance reports itself by its ALIVE packets in the network and therefore can be reached by all communication partners. Due to the CSR architecture, which will be described below, now all appliances know what information is to be found and where. If an appliance is removed from the bus or is turned off, no additional ALIVE packets are recognized any longer. An appliance is considered to be signed off when, after a time duration of $M \cdot T_{AM}$ with M=2, intervals, no ALIVE packet could be received anymore. After signing off, an appliance must sign on again as described above, but an attempt should be made to use the latest valid NODE-ID again. This ensures that very short and perhaps unintended signing off/signing on processes do not represent a load for all appliances, but are invisible for the appliances which are not participating in the communication. In order to make this possible, the particular NODE-ID used must be stored in a nonvolatile memory of the particular appliance, which is, for example, assigned to the appliance processor, after it was established in the first sign-on process and was recognized as valid. However, generally, during turning off or signing off, the appliances can be turned off completely, that is, the appliance can be separated completely from the network voltage. This is possible, because until the appliance is turned on again, this is considered not to be in the network any longer, since it is recognized only through its ALIVE packet and because, after the appliance is turned on again, the appliance can obtain information very quickly about the present status of the network by evaluating the ALIVE packets of the other active appliances. This can be done quickly, since the ALIVE packets are sent approximately once per second by each active appliance, as described above.

The individual appliances can check the status of the network regularly or only if a transaction is intended, depending on their performance potential.

The procedure for allocating NODE-IDs described above functions within a bus. When two buses are combined (TV appliance and video recorder with analog and digital satellite receiver), it may occur that duplicate NODE-IDs appear although the individual NODE-IDs were allocated correctly. If, in the evaluation of packets, any packet appears which contains its own NODE-ID as source address, this NODE-ID will be allocated twice. In this case, in the appliances+ own ALIVE packet, modifier mm, as described above, is set to INVALIDATE and both appliances sign on again at the network, according to the described mechanisms.

For example, the CSR architecture can be set up according to the standard IEEE 1212 called "Control and Status Registers (CSR) Architecture for Microcomputer Busses". The CSR architecture defines how the appliances that are connected to a bus or to a network can be made to react. The CSR architecture assumes that the appliances have a register, the content of which can be read through the network with a read command and the value of which can be changed through a write command. The CSR architecture defines a generally 64 bit address space and an at least 2 kbyte register address space. This is subdivided into a core-register region (0 to 511 byte), a bus-dependent register region (512 to 1023 byte) and a Read Only Memory (ROM) region (1024 to 2048 byte). The CSR address space is virtual and can be imaged on the address space of the microcontrollers or processors in the appliances. However, an arbitrary imaging is permissible and frequently sensible since mostly only a few of the possible registers are implemented.

Reading access to the register (and the ROM) is done through the READ transaction. The register contents can be modified with the WRITE and LOCK transactions. A transaction always consists of two messages, a CSR request and a CSR response.

Each appliance in the network can access the register of all other appliances with the aid of READ/WRITE/LOCK transactions. For this purpose, the requester sends a CSR request to the target appliance. The request message contains among others the register address, the number of bytes to be read or to be altered and, in the case of the writing request, the data. The target appliance answers with a corresponding CSR response, which contains the success status of the transaction, the transferred bytes and in the case of a reading request, the data.

The standard IEEE212 defines the register fundamentally with a 32 bit word size. Independently of this, write and read accesses can involve an arbitrary number of bytes. In the present practical example, it is provided that registers with an 8 bit word size are also permissible.

A high degree of error tolerance can be achieved by the fact that the CSR request and response are confirmed through the CRC and acknowledge of the link layer. In addition, a timeout transaction is defined within which the response must be sent. Otherwise, the transaction with the same transaction answer code can be repeated. For example, a transaction timeout of 500 ms is provided but this value can be adjusted through the so-called SPLIT_TIMEOUT register.

Figure 12:
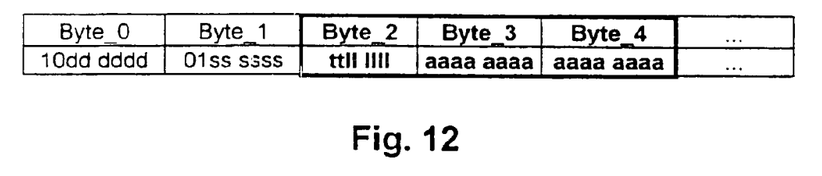

The WRITE transaction consists of the WRITE request and the corresponding WRITE response. A possible embodiment of the WRITE request is shown in FIG. 12. The address is followed by two bytes less than given in byte_2, since the length given in 111111 contains the address register, bytes_3 and byte_4. The transaction answer code tt can be selected arbitrarily by the sender and serves to make assignments to the response possible.

Figure 13:
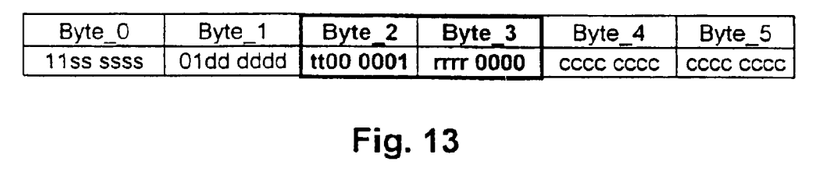
Figure 14:
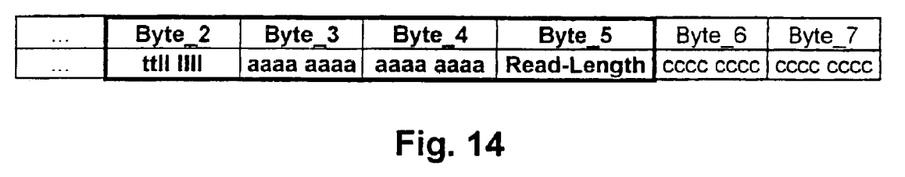

The target appliance must send a response with the same transaction answer code tt to the requester. The response code field rrrr in byte_3 signals the reason for success or failure. A possible embodiment of the WRITE response is shown in FIG. 13. The response code field rrrr can have, for example, the following meaning:

rrrr: 0000 Request processed successfully
    0100 Resource conflict, request can be repeated
    0101 Hardware error, data not available
    0110 No access (for example, ROM register)
    0111 Access to nonexisting register The READ transaction consists of the READ request and the corresponding READ response. The possible embodiment of the READ request is shown in FIG. 14. The transaction answer code tt can be selected arbitrarily by the sender and serves to make assignment to the response possible. The length 111111 given in byte_2 refers to the length of the request packet. The number of bytes to be read is in byte_5 Byte_3 and byte_4 contain the address register.

Figure 15:
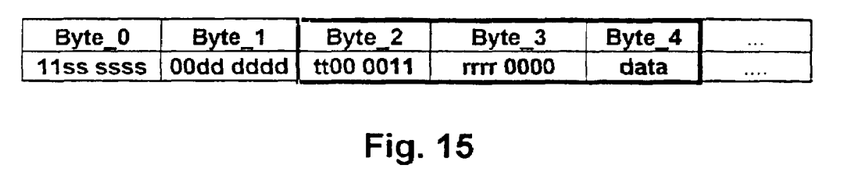

A possible embodiment of the READ response is shown in FIG. 15. The target appliance must send to the requester a response with the same transaction answer code tt. The response code field rrrr in byte_3 signals the cause of success or failure. The data follow after byte_4. The number of bytes is one less than the value in byte_2, since this includes the response code field, byte_3. The number of bytes transferred in the response message may be smaller than given in the request, but it can never be larger. The meaning of the response code rrrr corresponds to the meaning given above for the response code rrrr in connection with the WRITE transaction.

The LOCK transaction represents a so-called READ/MODIFY/WRITE transaction, and this can have many different embodiments. The COMPARE/SWAP transaction has a special meaning; this transaction has two input operands, the comparison data and the set data, as well as a result value. It first of all compares the comparison data sent in the request with the actual register content. If these are the same, the registers are described with the set data and if they are different, the register contents remain unchanged. The returned value is the old register value in each case.

The LOCK command allows several appliances to allocate resources of an individual appliance uniquely. This is achieved by, first of all, reading the old register value with a READ transaction and then, when setting the register with the LOCK transaction to the desired new value, using the previously read value as comparison value. The LOCK transaction will be successful only when the register content between the READ and LOCK command has not been modified by a third appliance.

Figure 16:
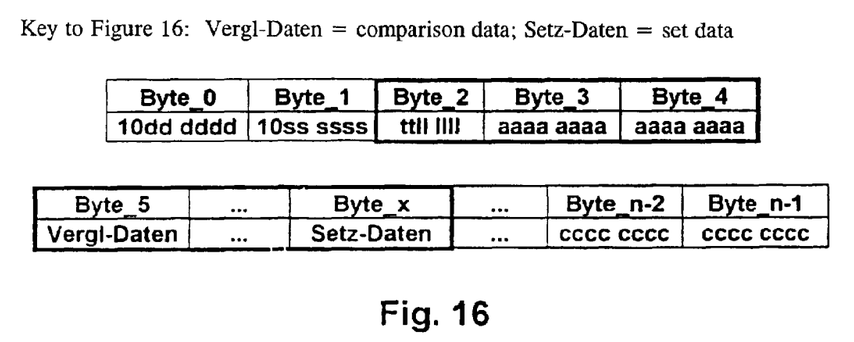

In contrast to IEEE 1212, which permits the LOCK transaction on the 32 bit and 64 bit register, it is provided to define the LOCK transaction for 8 bit and 32 bit word size. The LOCK transaction consists of the LOCK request and the corresponding LOCK response. A possible embodiment of the LOCK request is shown in FIG. 16. The transaction answer code tt can be selected by the sender arbitrarily and it serves to make assignment to the response possible. It should be noted that the length 111111 given in byte_2 contains the address as well as the number of bytes for comparison and the set data. The two must always be equally long.

Figure 17:
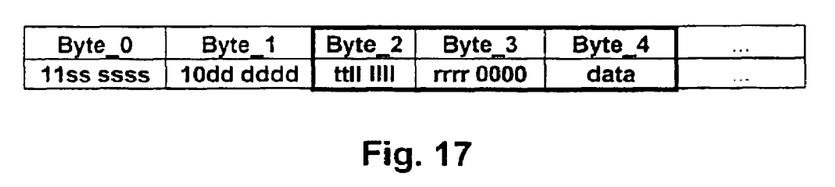

A possible embodiment of the LOCK response is shown in FIG. 17. The target appliance must send a response with the same transaction answer code tt to the requesting appliance. The response code field rrrr in byte_3 signals the cause of success or failure, as described above. After byte_4, as many byte data follow as given in the length data 111111 in byte_2. The structure of the LOCK request corresponds to that of the WRITE request and the LOCK response packet corresponds to that of the READ response.

The CSR registers are used to manage the network, the configuration of the appliances and the activation of the function units. The CSR address range is divided into several regions for this purpose:

| 0000h-01FFh | CSR core | Standard register for bus control |
|---|---|---|
| 0200h-03FFh | bus | Bus specific register |
| 0400h-07FFh | CSR-ROM | CSR configuration |
| 0B00h-FFFFh | FCP | function control |

The first two regions up to the address 03FFh serve for network management and will be described below. The structure and the possibilities of the CSR-ROM region will also be described below. In order to show how extensions of the register range can be carried out, let us mention the memory division of the register range for the Function Control Protocol (FCP) according to IEC 61883, which is used as an example above. For example, the protocol AV/C-CTS (Audio Video/Control—Command and Transaction Set) is carried out by through FCP, which contains protocols for activating all current electronics entertainment appliances.

The CSR core and the bus-specific register essentially serve for the management of the network. In the assigned address space, a few registers are prescribed:

| 0 | STATE_CLEAR | state and control information |
|---|---|---|
| 4 | STATE_SET | sets STATE_SET bits |
| 8 | NODE_IDS | required |
| 12 | RESET_START | required (command_reset) |
| 24 | SPLIT_TIMEOUT_HI | split requester timeout (seconds) |
| 28 | SPLIT_TIMEOUT_LO | as above (fraction of seconds) |
| 36 | ARGUMENT | diagnostic r/w test interface |
| 128-188 | MESSAGE_REQUEST | target address for messages |
| 192-252 | MESSAGE_RESPONSE | as above |

The two registers STATE_CLEAR and STATE_SET serve both as status display as well as for controlling the operational status of network node. They define the following among others:

STATE=appliance is on online (1) or is still in the initialization phase

OFF=appliance is on standby

The register NODE_IDS serves essentially to manage several networked networks and buses, since, in addition to the NODE-ID, it also defines the network-ID. The register RESET_START permits new initialization of the network node.

Split transaction are transactions which consist of request and response messages, separated in time, as is always the case for the transactions described above. The advantage for the target appliance is that the time requirements for processing a request can be adapted to the processing performance of the appliance. With the SPLIT_TIMEOUT registers, the appliance shows what the maximum length of time is needed for processing a request, and therefore a requesting appliance knows how long it must wait for the response. As second function, through the SPLIT_TIMEOUT register, the timeout can be changed from the outside, which, however, always requires cooperation of the target appliance.

The registers ARGUMENT and MESSAGE are optional, and their function is not specified uniquely beforehand.

For the proposed bus, it is expedient to define additional registers, for example, registers which establish uniquely what type of connection is used:

| PlugRegister | for chinch plug connection |
|---|---|
| PlugRegister | for SCART plug connection |

The task of the ROM configuration is the description of the appliances with regard to their static properties. These include, on the one hand, the Globally Unique ID (GUID), with which each appliance can be identified uniquely, and, on the other hand, a description of the properties of the appliances. The two types of information together are needed to make the attempted Hot Plug & Play possible.

The ROM configuration consists of a number of 32 bit inputs, which are also called quadlets. The ROM region is divided into two partial regions, the Bus Info Block and the Root Directory, as it is shown, for example, in FIG. 18. The Root Directory usually contains additional registers with system-describing information.

Figure 18:
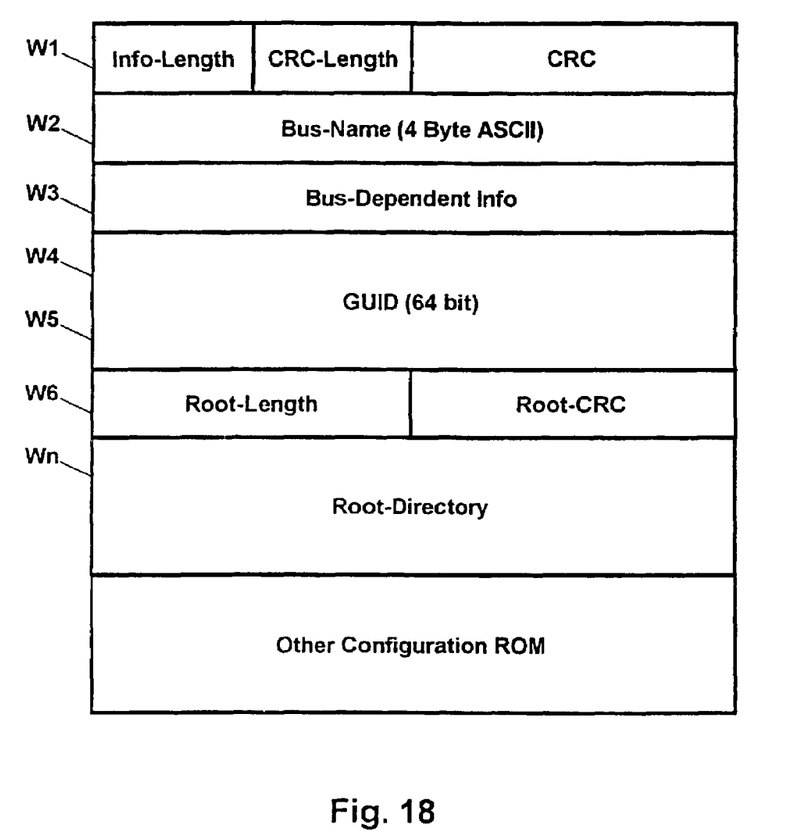
FIG. 18 is a practical example for the design of a configuration memory.

The first word W1 of the Bus Info Block contains the following parameters:

| Info length | length of the Bus Info Block measured in quadlets |
|---|---|
| CRC length | number of quadlets, which are protected by the next CRC |
| CRC | 16 bit CRC (as described above) |

The second word W2 contains the name of the bus standard, coded in ASCII characters, for example, GRL1. The third word W3 is bus-specific and can be defined according to need. There must be at least one max_rec field present, which determines the maximum permissible length of messages. The max_rec field can be contained in the second byte of the quadlet W3. The fourth and fifth word W4 and W5 contain the globally unique ID, consisting of the 24 bit manufacturer code, followed by a 40 bit appliance number.

The structure of the Root Directory, as well as the structure of all other directories, can be constructed as proposed in IEEE 1212. Each directory begins with a 32 bit directory header W6. This consists of two 16 bit inputs, of which the first one (root length) gives the number of following quadlets with directory information and the second one (root CRC) contains the CRC on the directory.

Figure 19:
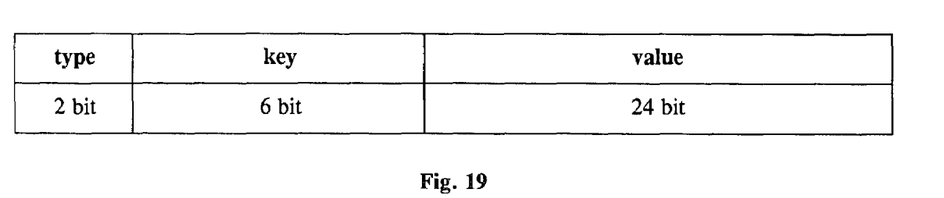
FIG. 19 is a practical example of the design of a memory word for the configuration memory according to FIG. 18.

Each directory input Wn is 32 bit long and is divided into two bits for type, six bits for key and 24 bits for value, as shown in FIG. 20. Data, which is less than 24 bit, is deposited directly into the 24 bits of the field value. The type is set to 00 in this case. Longer data, for example, text, are addressed indirectly. In these cases, the field value contains an offset in quadlets to the actual data. The type is set in this case to 01. The types LEAF, type set to 10, and DIRECTORY, type set to 11, permit a structure deposition of information by forming subregisters. In the case of LEAF, the field value contains an offset to a Leaf Directory, and in the case of DIRECTORY, the field value contains an offset to a directory.

While a large number of the codings possible for the 6-bit long field key is fixed (IEEE 1212), eight keys can be defined freely.

The present invention was described so far in combination with multimedia appliances, electronics entertainment appliances. However, it is obvious that other appliances can also be operated in the bus described, in case they have a suitable microcontroller or processor, which can be used for the evaluation of data packets described above.

The invention claimed is:

1. Method for controlling and/or exchanging of data for multimedia appliances, including electronics entertainment appliances, in which the multimedia appliances are connected through a bus, wherein each activated multimedia appliance sends at least one message through the bus to the other activated multimedia appliances within a predetermined first time duration ($T_{AM}$), and wherein each of the other activated multimedia appliances receiving the messages can recognize the sending multimedia appliances with the aid of the messages if the multimedia appliance receiving the message is activated, wherein the other multimedia appliances can no longer recognize one of the multimedia appliances as being active when no message was received at least after the elapse of a second predetermined time duration ($M*T_{AM}$) and wherein a multimedia appliance, which is activated for the first time or repeatedly, sends its own messages through the bus to the other activated multimedia appliances after the first or repeated activation only after a time period which is longer than or equal to a predetermined third time duration ($N*T_{AM}$).

2. Method according to claim 1, wherein the first time duration ($T_{AM}$) is shorter than the second time duration ($M*T_{AM}$) and the third time duration ($N*T_{AM}$), and/or the third time duration ($N*T_{AM}$) is longer than the second time duration ($M*T_{AM}$).

3. Method according to claim 1, wherein the messages of each activated multimedia appliance have a component, which describes the properties of the appliance.

4. Method according to claim 1, wherein each activated multimedia appliance has an unequivocal identification (node-ID) and that the unequivocal identification (node-ID) is a component of the message of the multimedia appliance.

5. Method according to claim 4, wherein the unequivocal identification (node-ID) is established randomly.

6. Method according to claim 4, wherein the unequivocal identification (node-ID) is derived from a superior unequivocal identification (GUIDE), where the superior unequivocal identification (GUIDE) contains more information than the unequivocal identification (node-ID).

7. Method according to claim 4, wherein each multimedia appliance which is activated for the first time or repeatedly, establishes its unequivocal identification (node-ID) only after a time period which is longer than or equal to the third time period ($N*T_{AM}$), where during this time period the multimedia appliance evaluates the messages of the other active multimedia appliances in order to determine the unequivocal identifications (node-ID) contained in them, in order to make its own unequivocal identification (node-ID) not equal to the detected unequivocal identifications (node-ID) of the other active multimedia appliances.

8. Method according to claim 1, wherein active multimedia appliances are evaluating the messages of the other active multimedia appliances continuously.

9. Method according to claim 1, wherein active multimedia appliances evaluate the messages of the other active multimedia appliances only before they control these and/or before they exchange data with these.

10. System installed for controlling and exchanging data for multimedia appliances, including electronics entertainment appliances, in which the multimedia appliances are connected with a bus, wherein each multimedia appliance has a bus interface and a processor, through which it sends messages through the bus to other multimedia appliances within a first predetermined time duration ($T_{AM}$), wherein the other multimedia appliances receive the sent messages with their bus interfaces and evaluate them with the aid of processors, wherein the evaluation of the messages gives information as to which multimedia appliances are activated, wherein the multimedia appliances are recognized as not being active when no message was received from at least one of the multimedia appliances after the elapse of a second time duration ($M*T_{AM}$), which corresponds at least to the predetermined time duration ($T_{AM}$), and wherein a multimedia appliance which is activated for the first time or repeatedly sends its own messages with the aid of a bus interface through the bus only after a third time duration ($N*T_{AM}$) which is longer than or equal to the first predetermined time duration ($T_{AM}$).

11. System according to claim 10, wherein the messages of each activated multimedia appliance have a component, which describes the properties of the multimedia appliance, where the properties are stored in a memory of the respective multimedia appliance.

12. System according to claim 10, wherein each activated multimedia appliance has an unequivocal identification (node-ID) and that the unequivocal identification (node-ID) is a component of the messages of the multimedia appliance, where the unequivocal identification (node-ID) is stored in a memory of the respective appliance.

13. System according to claim 12, wherein the unequivocal identification (node-ID) is established with the aid of a random generator.

14. System according to claim 12, wherein the unequivocal identification (node-ID) is derived by the processor from a superior unequivocal identification (GUIDE), where the superior unequivocal identification (GUIDE) is stored in the memory of the multimedia appliance and contains more information than the unequivocal identification (node-ID).

15. System according to claim 12, wherein each multimedia appliance which is activated for the first time or repeatedly establishes its unequivocal identification (node-ID) with the aid of its processor only after a time period which is longer than or equal to the predetermined time, where, during the time period, the messages of the other active multimedia appliances are evaluated in order to determine the unequivocal identifications (node-ID) contained in them, in order to establish the unequivocal identification (node-ID) not to be equal to the detected unequivocal identifications (node-ID) of the other active multimedia appliances.

16. System according to claim 10, wherein the active multimedia appliances, using their processors, evaluate continuously the messages of the other active multimedia appliances.

17. System according to claim 10, wherein the active multimedia appliances evaluate with their processors the messages of the other active multimedia appliances only before other multimedia appliances are controlled and before data are exchanged with other multimedia appliances.

18. Multimedia appliance installed for controlling and/or exchanging data with other multimedia appliances, including electronics entertainment appliances, with a bus interface and processor, wherein the multimedia appliance, in the activated state, sends messages through the bus interface with the aid of the processor within a predetermined first time duration ($T_{AM}$), wherein the multimedia appliance receives messages arriving at the bus interface and evaluates them with the aid of the processor, where the evaluation of the messages shows if other multimedia appliances are activated, where multimedia appliances are recognized as not being active when no message was received from the multimedia appliances after the elapse of a second time duration ($M*T_{AM}$) which corresponds at least to the predetermined first time duration ($T_{AM}$), and wherein the multimedia appliance sends its own messages through the bus interface with the aid of the processor upon first or repeated activation only after a third time duration ($N*T_{AM}$), which is longer than or equal to the predetermined first time duration ($T_{AM}$).

* * * * *